July 1, 1924.  1,499,475

J. H. PRINCE

TURBINE WATER WHEEL

Filed Dec. 8, 1921  5 Sheets-Sheet 1

J. H. Prince,
Inventor

By Chnow & Co.
Attorney

July 1, 1924.

J. H. PRINCE

TURBINE WATER WHEEL

Filed Dec. 8, 1921

J. H. Prince, Inventor

By C. A. Snow & Co.

Attorney

July 1, 1924.

J. H. PRINCE 1,499,475

TURBINE WATER WHEEL

Filed Dec. 8, 1921

J. H. Prince, Inventor

By C. A. Snow & Co.
Attorney

July 1, 1924.

J. H. PRINCE

TURBINE WATER WHEEL

Filed Dec. 8, 1921

J. H. Prince, Inventor

By C. A. Snow & Co.
Attorney

July 1, 1924.

J. H. PRINCE 1,499,475

TURBINE WATER WHEEL

Filed Dec. 8, 1921

J. H. Prince, Inventor

By C. A. Snow & Co.
Attorney

Patented July 1, 1924.

1,499,475

UNITED STATES PATENT OFFICE.

JOHN H. PRINCE, OF VALLIANT, OKLAHOMA.

TURBINE WATER WHEEL.

Application filed December 8, 1921. Serial No. 520,952.

*To all whom it may concern:*

Be it known that I, JOHN H. PRINCE, a citizen of the United States, residing at Valliant, in the county of McCurtain and State of Oklahoma, have invented a new and useful Turbine Water Wheel, of which the following is a specification.

This invention relates to fluid motors or turbines, the primary object of the invention being to provide a fluid motor wherein the volume of fluid passing to the blades of the rotary element of the motor, may be regulated to cause the rotary element to be operated at various speeds.

A further object of the invention is to provide means for distributing the volume of fluid passing to the wheel or rotary element, to insure the fluid impinging on all of the blades of the wheel.

A still further object of the invention is to provide means for insuring the maximum power from a given quantity of fluid, by constructing the wheel or rotary element to receive the entire volume of fluid directed thereto.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1:
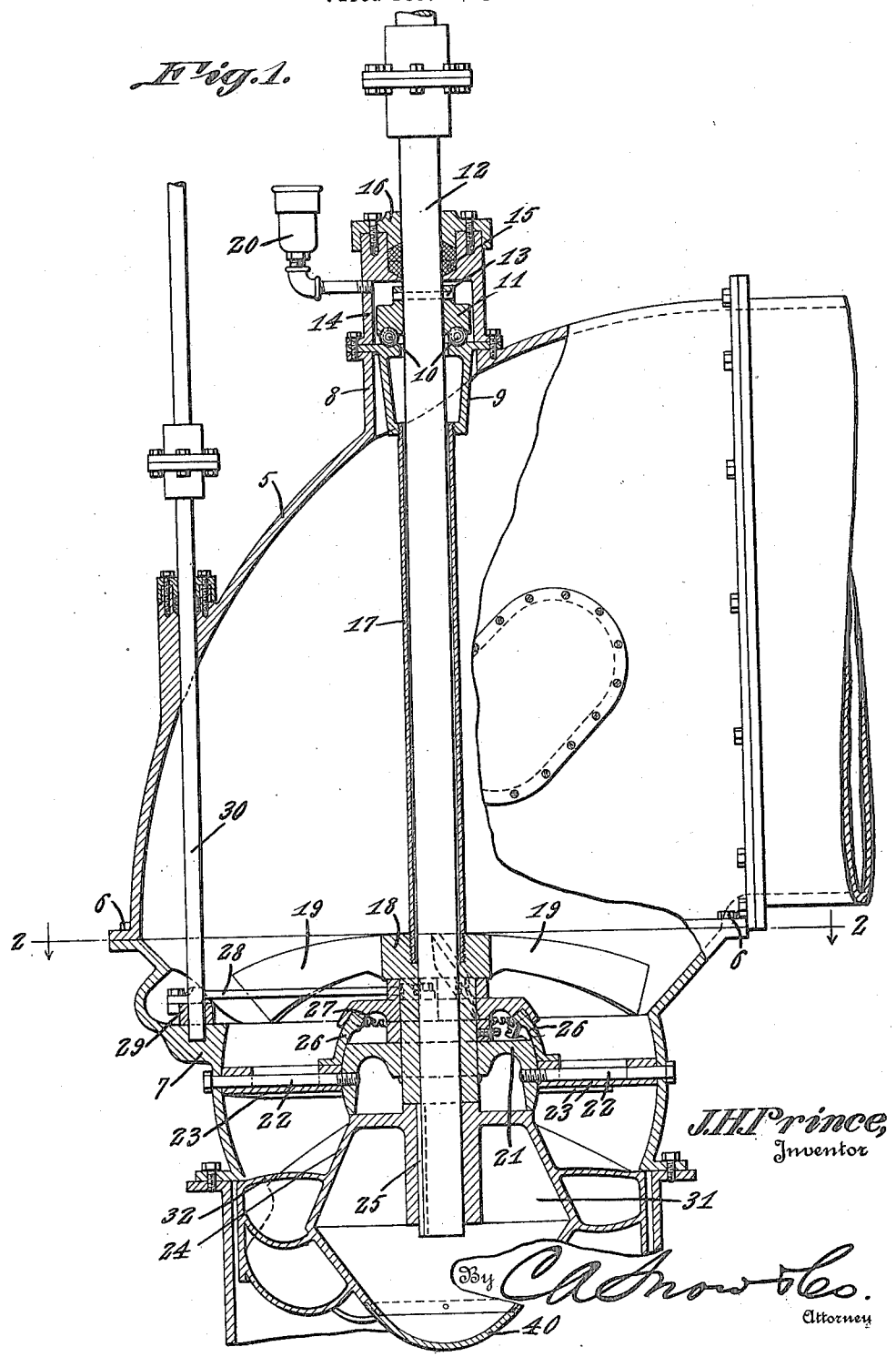
Figure 1 is an elevational view of a fluid motor constructed in accordance with the present invention, a portion of the casing being broken away to illustrate the wheel and gates controlling the passage of fluid thereto.

Referring to the drawings in detail, the reference character 5 designates the upper portion of the motor casing which is flanged adjacent to its lower end to accommodate the bolts 6 that connect the upper casing 5 with the wheel housing 7, the upper portion of the casing being curved and provides a conduit to direct fluid to the lower portion of the casing.

The upper portion 5 of the casing is provided with flanges 8 which support the enlarged bearing member 9 on which moves the ball bearings 10, the ball bearings being interposed between the bearing 9 and bearing 11, which is secured to the motor shaft 12, as by means of the transversely extending pin 13.

The bearing 9 is flanged and is supported between the flanges 8 and bearing housing 14, the upper portion of the bearing housing being cut away to accommodate the gaskets 15 which are held into position by means of the movable cap 16 to insure a fluid-tight connection between the shaft 12 and housing 14.

Bearing member 9 is hollow to accommodate the shaft 12 and provides means for supporting the tubular shaft housing 17, the lower end of the housing 17 being threaded and disposed within a threaded opening in the guiding member 18 which is provided with a plurality of curved guiding blades 19 that lie in the path of travel of the fluid entering the lower portion 7 of the casing, to direct the fluid to the wheel, to be hereinafter more fully described. Communicating with the interior of the housing 14 is an oil cup 20 which supplies oil to the ball bearings 10 from where the oil may pass through the tubular casing 17 and lubricate the bearings which are disposed at the lower end of the shaft 12.

The hub of the guiding member 18 extends downwardly and forms a bearing for the gate support 21 which is provided with threaded openings to accommodate the threaded extremities of the bolts 22, the outer ends of the bolts being positioned in suitable openings provided in the lower section 7 of the motor casing. These bolts 22 support the movable blades 23 which constitute the gate that controls the passage of fluid to the wheel 24 which is supported thereunder, and which is secured to the shaft 12 as by means of the key 25, so that movement of the wheel 24 will result in a relative rotary movement of the shaft 12.

Figure 2:
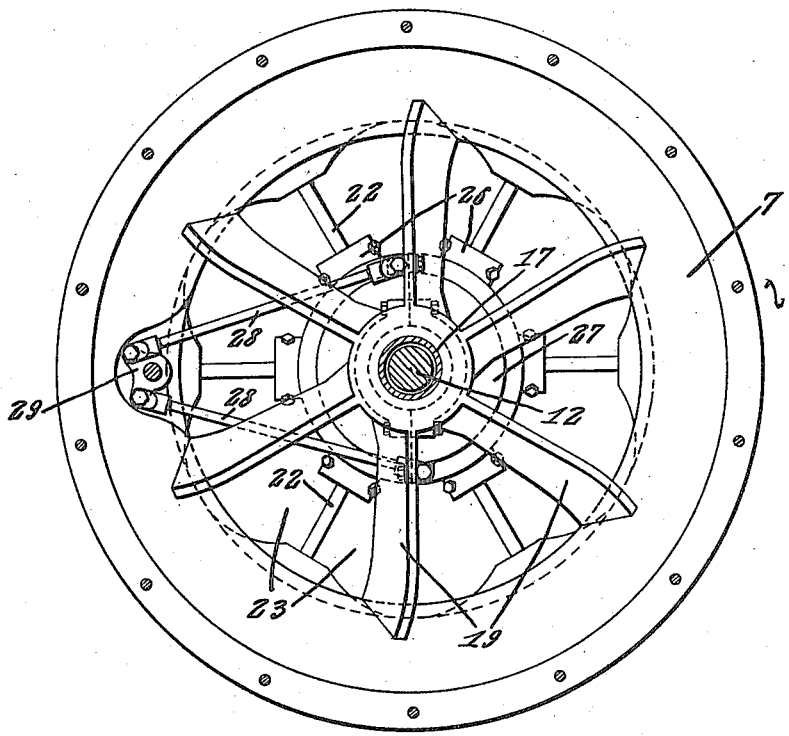
Figure 2 is a sectional view taken on line 2—2 of Figure 1.
Figure 3:
Figure 3 is a sectional view through adjacent gates, when the same are moved to cut off the passage of fluid to the wheel.
Figure 4:
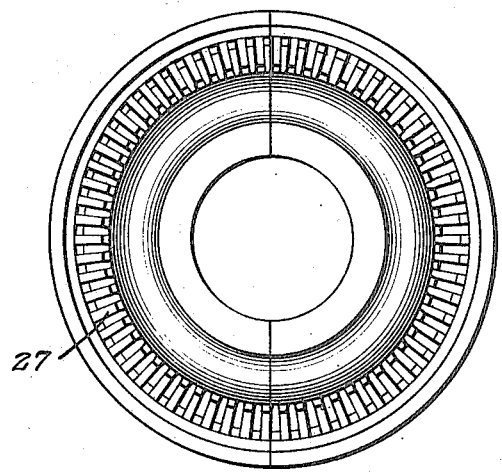
Figure 4 is a plan view of the ring gear used in connection with the movable gates.
Figure 5:
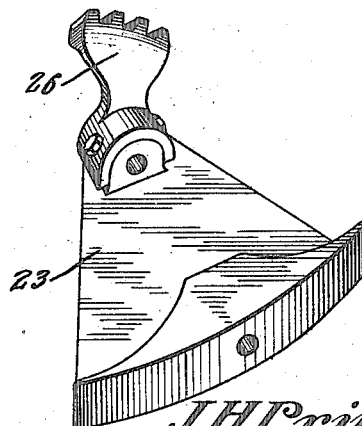
Figure 5 is a perspective view of one of the gate supports.
Figure 6:
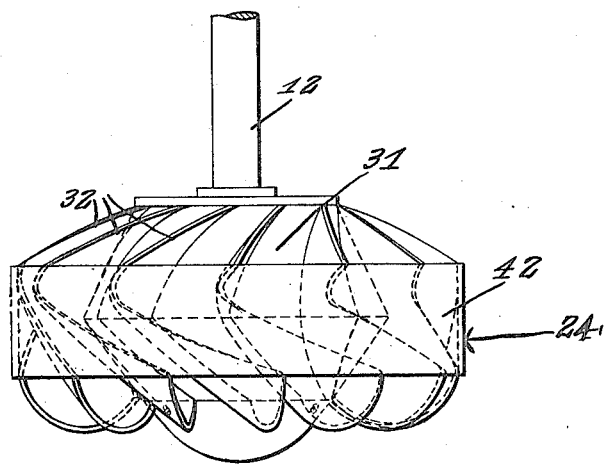
Figure 6 is a side elevational view of the rotary element or wheel.
Figure 7:
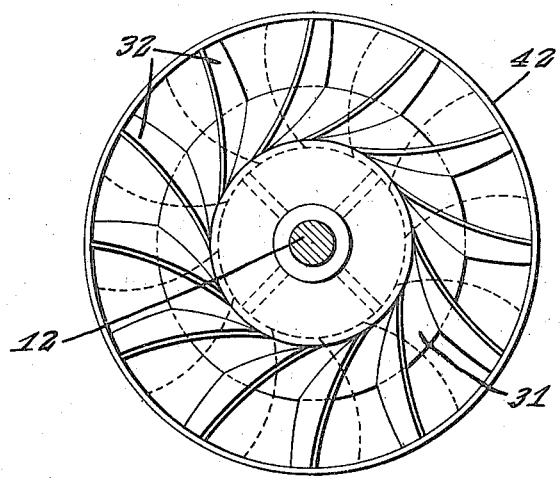
Figure 7 is a plan view of the same.

These blades 23 are arranged circumferentially of the gate support 21 so that adjacent ends thereof, will overlap, as clearly shown by Figure 2 of the drawings, thereby providing means for entirely cutting off the flow of fluid to the wheel, to cease the rotation thereof.

A segmental rack 26 is carried by each blade 23, and is disposed adjacent to the inner edge thereof, which racks 26 of the blades 23 are held in mesh with the ring gear 27 which is mounted thereabove, the ring gear having connection with the rods 28 that are carried by the member 29 supported at the lower end of the controlling rod 30, the connection between the rod 30 and rods 28 being such that movement of the rod 30 in a horizontal plane will result in a relative rotary movement of the ring gear 27 to move the blades 23 to predetermined positions to control the volume of fluid passing to the wheel.

The wheel 24 embodies a hollow body portion 31 which is formed with blades 32 that are constructed to provide curved passageways so that when water enters the passageways from a vertical plane, the same is forced laterally, due to the constructions of the blades, with the result that the wheel 24 is rotated within its housing.

This wheel 24 is formed with a band 42, the band being cast with the blades of the wheel and designed to brace the blades at the periphery of the wheel.

Figure 8:
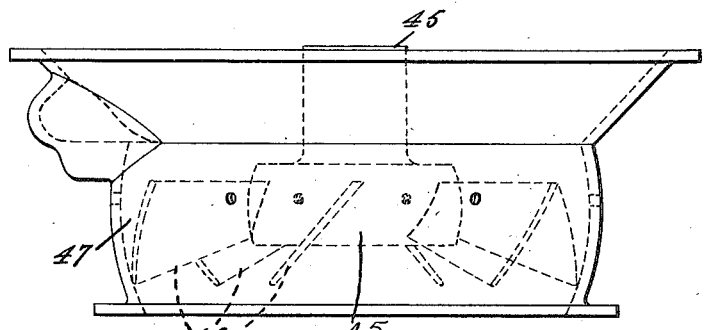
Figure 8 is an elevational view of a modified form of guide and casing, the wheel being shown in dotted lines as supported within its casing.
Figure 9:
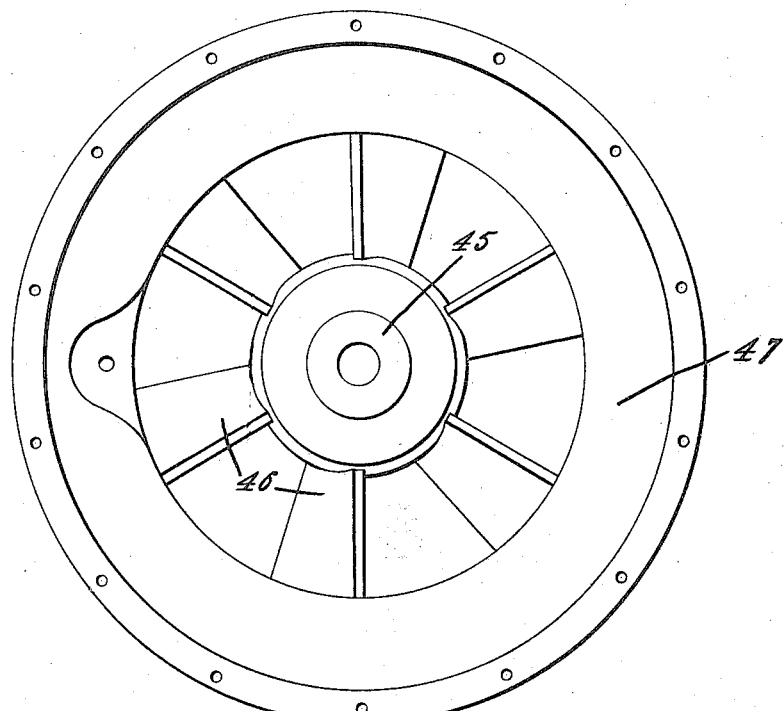
Figure 9 is a plan view of the same.

In the form of the invention as shown by Figures 8 and 9 of the drawings, the guide and support embodies a hub 45, and radiating blades 46 which are secured thereto, the outer ends of the blades operating in proximity to the housing wall 47 to eliminate the passage of fluid through the housing 47 between the ends of the blades and the inner wall thereof. These blades 46 are disposed at angles with respect to the vertical, and provide surfaces to cam the fluid from the wheel with the result that the wheel is rotated.

In the operation of the device, it is to be understood that the casing is in communication with a suitable pipe which directs fluid to the interior of the casing, where the same passes downwardly and onto the wheels supported at the lower portion of the casing. The rod 30 is moved to pivot the blades 23 of the gate to permit the required quantity of fluid to pass therethrough, to cause the wheel to operate at a predetermined speed.

When it is desired to stop the rotation of the wheel, the rod 30 is operated to move the blades into positions as shown in Figure 1 of the drawings, whereupon the fluid will back up in the upper portion of the casing.

Having thus described the invention, what is claimed as new is:—

1. In a water motor, a casing, bearings supported within the casing, a water wheel within the casing, bolts extending through the casing, pivoted blades arranged above the wheel and mounted on the bolts for pivotal movement, a segmental rack disposed at an angle and carried by each blade, a ring gear disposed above the segmental racks and in mesh therewith, means having connection with the ring gear for moving the same to swing the pivoted blades on their bolts to regulate the passage of fluid to the water wheel, and guiding blades arranged above the pivoted blades to direct fluid to the water wheel.

2. In a water motor, a casing, a shaft extending through the casing and carrying a wheel at its lower end, pivoted blades disposed above the wheel and adapted to be moved to regulate the quantity of fluid passing to the wheel, segmental gears carried by the blades, a gear in mesh with the segmental gears, rods having connection with the gear to move the same in a horizontal plane, means for moving the rods to operate the gear, and means above the blades for directing fluid thereto.

In testimony that I claim the foregoing as my own, I have hereto affixed my signature in the presence of two witnesses.

JOHN H. PRINCE.

Witnesses:
JAMES M. CECIL,
E. J. GARDNER.